United States Patent
Hasegawa et al.

(10) Patent No.: US 10,207,459 B2
(45) Date of Patent: Feb. 19, 2019

(54) WORKING METHOD FOR END PORTION OF PLATE MEMBER, MANUFACTURING METHOD FOR PLATE MEMBER, WORKING APPARATUS FOR END PORTION OF PLATE MEMBER, AND PLATE MEMBER

(71) Applicants: Mitsuiya Industrial Co., Ltd., Toyota-shi, Aichi (JP); Toyota Jidosha Kabushiki Kaisha, Toyota-shi, Aichi-ken (JP)

(72) Inventors: Satoshi Hasegawa, Nagakute (JP); Wataru Minoura, Nagoya (JP); Takuji Ono, Toyota (JP); Sachiko Nishi, Toyota (JP)

(73) Assignees: MITSUIYA INDUSTRIAL CO., LTD, Toyota-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 355 days.

(21) Appl. No.: 14/900,479

(22) PCT Filed: Jun. 20, 2014

(86) PCT No.: PCT/JP2014/066418
§ 371 (c)(1),
(2) Date: Dec. 21, 2015

(87) PCT Pub. No.: WO2014/203992
PCT Pub. Date: Dec. 24, 2014

(65) Prior Publication Data
US 2016/0151967 A1 Jun. 2, 2016

(30) Foreign Application Priority Data
Jun. 21, 2013 (JP) .................. 2013-130678

(51) Int. Cl.
*B29C 53/04* (2006.01)
*B29C 67/00* (2017.01)
(Continued)

(52) U.S. Cl.
CPC ........ *B29C 67/0044* (2013.01); *B29C 69/001* (2013.01); *B29C 53/04* (2013.01); *B29K 2101/12* (2013.01); *B29K 2105/256* (2013.01)

(58) Field of Classification Search
CPC .................. B29C 67/0044; B29C 69/001
(Continued)

(56) References Cited

U.S. PATENT DOCUMENTS 6,161,895 A * 12/2000 Jaeckle ............... B29C 53/34
296/214
7,874,832 B2 * 1/2011 Kujawa ............. B60R 13/0231
156/216
8,469,444 B2 * 6/2013 Eickhoff ................ B29C 51/00
296/214

FOREIGN PATENT DOCUMENTS

JP S53-137274 A 11/1978
JP H01-118432 A 5/1989
(Continued)

*Primary Examiner* — Robert C Dye
*Assistant Examiner* — Russell E Sparks
(74) *Attorney, Agent, or Firm* — Oliff PLC

(57) ABSTRACT

A working method for an end portion of a plate member includes heating and pressing the end portion of the plate member formed of a thermoplastic resin in a thickness direction to form a thin portion, folding the thin portion such that a pressed surface is positioned inside to move an outer peripheral end of the thin portion as an end portion on an outer peripheral side of the plate member to the vicinity of a main body portion of the plate member to which an inner end of the thin portion as an end portion on an inner side of the plate member is connected, and pressing the outer peripheral end of the thin portion in the thickness direction (Continued)

to move the outer peripheral end thereof further inward than a surface of the main body portion in the thickness direction.

15 Claims, 11 Drawing Sheets

(51) Int. Cl.
  *B29C 69/00* (2006.01)
  *B29K 101/12* (2006.01)
  *B29K 105/00* (2006.01)
(58) Field of Classification Search
  USPC .......................................................... 264/138
  See application file for complete search history.

(56) References Cited

FOREIGN PATENT DOCUMENTS

| | | |
|---|---|---|
| JP | H10-166438 A | 6/1998 |
| JP | 2000-190384 A | 7/2000 |
| JP | 2006-123322 A | 5/2006 |

\* cited by examiner

WORKING METHOD FOR END PORTION OF PLATE MEMBER, MANUFACTURING METHOD FOR PLATE MEMBER, WORKING APPARATUS FOR END PORTION OF PLATE MEMBER, AND PLATE MEMBER

TECHNICAL FIELD

The invention relates to a working method for an end portion of a plate member formed of a thermoplastic resin (e.g., resin cardboard or the like. Hereinafter, the plate member is also referred to as "a resin plate member" for the convenience of description), a manufacturing method for the resin plate member, a working apparatus for the end portion of the resin plate member, and the resin plate member.

BACKGROUND ART

Conventionally, a resin plate member is put to various uses (e.g., a floor material of a trunk of an automobile or the like). In general, the resin plate member is cut into a desired shape corresponding to its use, and is then subject to a step of performing various working processes on its end portion (terminal portion) including a cut surface from the viewpoint of improving beauty of the resin plate member and reducing a sense of harm, whereby the resin plate member is manufactured.

For example, in one of conventional working methods (hereinafter referred to as "a conventional method"), a notch having a specific shape is formed in a pressed surface while an end portion of a plate member formed of a synthetic resin is heated and pressed, the end portion of the plate member is bent (folded) along the notch, and a cut surface of the end portion is thereby accommodated inside the plate member. With this, the conventional method prevents the cut surface from being exposed at the end portion of the plate member and enhances the beauty of the plate member and the like (see, e.g., Patent Document 1).

Patent Document 1: Japanese Patent Application Publication No. 2000-190384

SUMMARY OF THE INVENTION

In the conventional method, by forming the shape of the notch provided in the end portion of the plate member into the specific shape, the cut surface of the end portion is held inside the plate member with an operation in which the end portion is folded. That is, the conventional method is based on the assumption that "the entire portion of the cut surface of the end portion of the plate member is always held inside the plate member with the operation in which the end portion is folded".

However, in general, there are cases where the entire portion of the cut surface is not necessarily accommodated inside the plate member due to variations in working accuracy when the end portion of the plate member is worked (e.g., at the time of heating and pressing or folding) and variations in the dimensions of the plate member, and part of the cut surface is exposed on a surface of the plate member. In these cases, there is a possibility that the beauty of the plate member is not enhanced as expected.

In view of the above problem, the invention provides a working method for the end portion of the resin plate member capable of preventing the end portion (the cut surface) of the resin plate member from being exposed on the surface of the resin plate member as easily and reliably as possible, a manufacturing method for the resin plate member that uses the working method, a working apparatus for the end portion of the resin plate member that executes the working method, and a resin plate member.

First, "a working method for an end portion of a plate member" of the invention will be described.

The working method for the end portion of the plate member of the invention for achieving the above object is applied to the plate member formed of a thermoplastic resin.

The working method includes (1) a first step of heating and pressing the end portion of the plate member in a thickness direction to form a thin portion, (2) a second step of folding the thin portion such that a pressed surface is positioned inside to move an outer peripheral end of the thin portion as an end portion on an outer peripheral side of the plate member to a vicinity of a main body portion of the plate member to which an inner end of the thin portion as an end portion on an inner side of the plate member is connected, and (3) a third step of pressing the outer peripheral end of the thin portion in the thickness direction to move the outer peripheral end of the thin portion further inward than a surface of the main body portion in the thickness direction.

According to the above configuration, with the first step and the second step, the outer peripheral end of the thin portion (in other words, an end portion including a cut surface of the plate member) is moved toward the main body portion of the plate member. After theses steps, the cut surface of the plate member does not exist at a terminal portion (an outer edge portion) of the plate member. Further, with the third step, the outer peripheral end of the thin portion (the end portion including the cut surface of the plate member) is moved further inward than the surface of the main body portion in the thickness direction (in other words, so as not to be exposed to the outside of the plate member). Accordingly, even when part of the outer peripheral end of the thin portion is exposed on the surface of the plate member due to the above various variations (variations in working accuracy in the first step and the second step and variations in the dimensions of the plate member), the outer peripheral end including the exposed portion is buried in the plate member in the third step. In addition, in general, the movement of the outer peripheral end of the thin portion in the thickness direction does not require a complicated method, and hence it is possible to easily execute the third step. Therefore, with the above configuration, the outer peripheral end of the thin portion is prevented from being exposed on the surface of the plate member easily and reliably.

Note that, similarly to the first step and the second step, also in the third step, there is a possibility that variations in working accuracy occur. However, in general, the working accuracy required in the third step (the working process of moving the outer peripheral end of the thin portion in the thickness direction) is lower than the working accuracy required in each of the first step (heating and pressing of the end portion of the plate member) and the second step (folding of the thin portion). In other words, even when a certain level of variations occurs in the working accuracy in the third step (e.g., the movement amount of the outer peripheral end of the thin portion or the like), the outer peripheral end of the thin portion is adequately prevented from being exposed on the surface of the plate member.

In addition, after the first to third steps, there is a possibility that the end portion of the main body portion of the plate member (a boundary between the thin portion and the main body portion) is exposed on the surface of the plate member, and the end portion of the main body portion influences the beauty of the plate member and a sense of harm. However, the end portion is formed by pressing the plate member (see the first step and the second step), and the shapes of an end surface and an angular portion are gentler than those of the terminal portion (the cut surface) of the plate member (e.g., the radius of curvature of the angular portion of the end portion of the main body portion is larger than that of the angular portion of the cut surface). Accordingly, an advantage obtained by preventing the exposure of the terminal portion (the cut surface) of the plate member exceeds a disadvantage caused by exposing the end portion of the main body portion from the viewpoint of improving the beauty of the plate member and reducing the sense of harm.

Consequently, the working method of the invention is capable of easily and reliably preventing the end portion (the cut surface) of the resin plate member from being exposed on the surface of the resin plate member. Further, with this, it is possible to improve the beauty of the plate member and reduce the sense of harm.

Incidentally, "the plate member" to which the working method of the invention is applied only needs to be a plate-shaped body formed of the thermoplastic resin, and its shape, its internal structure, and a specific type of the resin are not particularly limited. For example, as the plate member, resin cardboard and a styrene foam plate may be used.

In "the first step", the end portion of the plate member is heated and pressed, and the thin portion (a heated and pressed portion) thereby extends from the main body portion of the plate member (a portion that is not heated and pressed) toward the terminal portion of the plate member. Accordingly, the first step may be reworded as, e.g., "a step of heating and pressing the end portion of the plate member in the thickness direction to form the thin portion that extends from the main body portion of the plate member in a direction toward the outer periphery of the plate member".

"Pressing" in the first step only needs to be a working process of exerting an external force in a direction in which the plate member is compressed (a direction in which the thickness of the plate member is reduced. The thickness direction) on the surface of the plate member, and the specific mode of the pressing is not particularly limited. An example of the mode of the pressing includes a working process of fixing the plate member such that the plate member is not movable and pressing a pressing body against the plate member from the outside. Conversely, an example thereof includes a working process of fixing the pressing body such that the pressing body is not movable and pressing the plate member against the pressing body. Further, an example thereof includes a working process of moving both of the plate member and the pressing body and pressing the plate member and the pressing body against each other. The same applies to "pressing" in the third step.

The wording "to move an outer peripheral portion of the thin portion . . . to a vicinity of the main body portion of the plate member" denotes that the outer peripheral end of the thin portion is present in the vicinity of the main body portion when the thin portion is folded, and the outer peripheral end of the thin portion and the main body portion need not necessarily be in intimate contact with or be adjacent to each other completely. The wording may be reworded as, e.g., that the outer peripheral portion of the thin portion is moved to a position apart from the outer periphery of the plate member.

Note that the thin portion is connected to the main body portion of the plate member at the inner end. Accordingly, when the outer peripheral end of the thin portion is moved to the vicinity of the main body portion of the plate member in the second step, the outer peripheral end of the thin portion is also moved to the vicinity of the inner end of the thin portion. Therefore, the above wording may be reworded as, e.g., that the outer peripheral end of the thin portion is moved to the vicinity of the inner end.

"Pressing" of the outer peripheral end of the thin portion in the third step may be pressing with heating (heating and pressing), and may also be pressing without heating. For example, pressing in the third step may not involve its own heating, and the pressing may be performed while retained heat resulting from the heating and pressing in the first step remains in the plate member. The same applies to "folding" in the second step.

The wording "further inward than a surface of the main body portion in the thickness direction" in the third step may be reworded as a position apart from a reference plane in a pressing direction (the thickness direction) in the case where an imaginary plane obtained by extending the surface of the main body portion is used as the reference plane. In addition, the above wording may be reworded as between a front surface and a back surface of the plate member (strictly speaking, between positions at which a front surface and a back surface of the end portion of the plate member have been present before the end portion is worked into the thin portion in the first step (before the first step is performed)).

Therefore, the wording that the outer peripheral end of the thin portion "is moved further inward than a surface of the main body portion in the thickness direction" in the third step may be reworded as that the outer peripheral end of the thin portion is moved to a position apart from the imaginary plane (the reference plane) obtained by extending the surface of the main body portion in the pressing direction (the thickness direction). In addition, the above wording may be reworded as that the outer peripheral end of the thin portion is moved between the front surface and the back surface of the plate member. Further, the above wording may be reworded as that the thickness of the thin portion at the position at which the outer peripheral end of the thin portion is present (the thickness of the thin portion folded in the second step in the pressing direction) is reduced to be smaller than the thickness of the main body portion.

Note that "a surface of the main body portion" mentioned above may be reworded as a plane that is perpendicular to the thickness direction (the pressing direction) of the plate member among planes defining the main body portion, and is present on the same side as the pressed surface of the thin portion. Further, in general, the plate member having been subjected to the working method (e.g., the plate member as a product) is handled in many cases with its surface on "the same side as the pressed surface of the thin portion" used as a back surface and its surface on the opposite side of the pressed surface of the thin portion used as a front surface (what is called a design surface). Accordingly, "the front surface" of the plate member may be reworded as a plane that is perpendicular to the thickness direction (the pressing direction) of the plate member among planes defining the plate member, and is a surface present on the opposite side of the pressed surface of the thin portion. In addition, "the back surface" of the plate member may be reworded as a plane that is perpendicular to the thickness direction (the pressing direction) of the plate member among planes defining the plate member, and is a surface present on the same side as the pressed surface of the thin portion.

In addition, the degree of pressing in the third step (e.g., a movement amount of the outer peripheral end of the thin portion by pressing, a pressed area of the thin portion, and a final cross-sectional shape of the plate member) may be appropriately determined in consideration of the degree of beauty required of the plate member, the degree of reduction of the sense of harm, the internal structure of the plate member, and the thickness of the plate member, and is not particularly limited (see, e.g., individual aspects described later).

The configuration and effects of the working method of the invention have been described thus far. Next, hereinbelow, various aspects (aspects 1 to 5) of the working method of the invention will be described.

Aspect 1

As described above, in the working method of the invention, the outer peripheral end of the thin portion is moved further inward than the surface of the main body portion in the thickness direction in the third step. At this point, depending on the movement amount of the outer peripheral end of the thin portion, there are cases where unexpected deformations such as a swell and a burr occur around the outer peripheral end (in the vicinity of the outer peripheral end in the main body portion and in the vicinity of the outer peripheral end in the thin portion). It is preferable to prevent such deformations from the viewpoint of further improving the beauty of the plate member.

To cope with this, as the working method of the invention (the aspect 1), the thin portion may be formed such that the pressed surface has a concave portion at a position around the inner end of the thin portion in the first step.

As described above, when the outer peripheral end of the thin portion is moved to the vicinity of the main body portion in the second step (folding), the outer peripheral end of the thin portion is also moved to the vicinity of the inner end of the thin portion. Accordingly, when the concave portion is provided at the position around the inner end as in the above configuration, a gap corresponding to the concave portion is present near the outer peripheral end of the thin portion after the second step (see, e.g., FIG. 6).

When the outer peripheral end of the thin portion is pressed in the third step, the outer peripheral end of the thin portion enters (flows into) the above gap (the concave portion). With this, as compared with the case where the above gap (the concave portion) is not present, the unexpected deformations described above are less likely to occur. In addition, as compared with the case where the above gap (the concave portion) is not present, it is possible to move the outer peripheral end of the thin portion in the thickness direction more easily.

Consequently, the working method of the aspect is capable of further improving the beauty of the plate member while easily and reliably preventing the end portion (the cut surface) of the resin plate member from being exposed on the surface of the resin plate member.

Incidentally, "the concave portion" provided in the pressed surface of the thin portion only needs to be a portion of the thin portion having a thickness smaller than that of its surrounding portion, and the width, the depth, and the cross-sectional shape of the concave portion are not particularly limited. The width, the depth, and the cross-sectional shape of the concave portion may be determined in consideration of the thickness and the cross-sectional shape of the plate member and the type of the resin forming the plate member such that the above-described unexpected deformations are adequately prevented.

Aspect 2

In the third step of the working method of the invention, the outer peripheral end of the thin portion is pressed in the thickness direction. At this point, only the outer peripheral end of the thin portion need not necessarily be pressed, and a portion present around the outer peripheral end may also be pressed in addition to the outer peripheral end of the thin portion.

Specifically, as the working method of the invention (the aspect 2), a portion of the main body portion present around the outer peripheral end of the thin portion may be pressed in the thickness direction together with the outer peripheral end of the thin portion in the third step.

According to the above configuration, the boundary between the thin portion and the main body portion (the end portion of the main body portion) is moved further inward than the surface of the main body portion in the thickness direction (see, e.g., FIGS. 7 and 14). With this, the boundary becomes less visible and a finger of a user or the like becomes less likely to come into contact with the boundary.

Consequently, the working method of the aspect is capable of further improving the beauty of the plate member and further reducing the sense of harm while preventing the end portion (the cut surface) of the resin plate member from being exposed on the surface of the resin plate member further easily and reliably.

Note that the degree of pressing in the aspect may be appropriately determined in consideration of the degree of the beauty required of the plate member, the degree of reduction of the sense of harm, the internal structure of the plate member, and the thickness of the plate member, and is not particularly limited.

Aspect 3, Aspect 4

Further, in the third step of the invention, only the outer peripheral end of the thin portion (or the portion around the outer peripheral end) may be pressed in the thickness direction, and the entire portion of the thin portion may also be pressed in the thickness direction together with the outer peripheral end.

Specifically, as the working method of the invention (the aspect 3), only the outer peripheral end of the thin portion (or the portion around the outer peripheral end) may be pressed such that a concave portion in which the outer peripheral end of the thin portion is buried in the plate member is formed in the third step.

According to the above configuration, since the outer peripheral end of the thin portion is buried in the concave portion (a depression) (see, e.g., FIG. 8), the finger of the user or the like becomes less likely to come into contact with the outer peripheral end. Note that, similarly to the foregoing, the shape of the concave portion (the depression) or the like may be appropriately determined in consideration of the degree of the beauty required of the plate member, the degree of reduction of the sense of harm, the internal structure of the plate member, and the thickness of the plate member, and is not particularly limited. For example, a sufficient reduction in the width of the concave portion (the depression) (the width from the main body portion of the plate member in the direction toward the outer periphery) makes the concave portion less visible and also makes the finger of the user or the like less likely to enter the concave portion, and hence the sufficient reduction therein is preferable from the viewpoint of improving the beauty of the plate member and reducing the sense of harm.

In contrast to this, as the working method of the invention (the aspect 4), an entire portion of the thin portion including the outer peripheral end of the thin portion may be pressed in the thickness direction in the third step.

According to the above configuration, as compared with the case where the concave portion in which the outer peripheral end of the thin portion is buried is formed (the aspect 3), it is possible to prevent the outer peripheral end of the thin portion (or its surrounding portion) from being pressed locally (see, e.g., FIG. 15), and hence it is possible to prevent the occurrence of the unexpected deformations (the swell and the burr) around the outer peripheral end of the thin portion further reliably. Note that, in the case of the aspect, a flat portion (a portion obtained by pressing the thin portion) having a thickness smaller than that of the main body portion is formed around the plate member.

Consequently, the working methods of these aspects are capable of further improving the beauty of the plate member and further reducing the sense of harm while preventing the end portion (the cut surface) of the resin plate member from being exposed on the surface of the resin plate member further easily and reliably.

Aspect 5

The plate member to which the working method of the invention is applied need not necessarily be formed only of the thermoplastic resin, and may include a portion formed of another material.

For example, in the working method of the invention (the aspect 3), buffer layers may be provided on respective main surfaces of the plate member.

With the above configuration, when the outer peripheral end of the thin portion is pressed in the thickness direction in the third step, the outer peripheral end (the cut surface) of the thin portion is covered with the buffer layers. With this, the outer peripheral end (the cut surface) of the thin portion further becomes less visible, and the finger of the user or the like further becomes less likely to come into contact with the outer peripheral end of the thin portion.

Consequently, the working method of the aspect is capable of further improving the beauty of the plate member and further reducing the sense of harm while easily and reliably preventing the end portion (the cut surface) of the resin plate member from being exposed on the surface of the resin plate member.

Incidentally, "main surfaces of the plate member" mentioned above denote surfaces of the surfaces of the plate member other than side surfaces (i.e., denote the front surface and the back surface). In the case where the thickness of the plate member is uniform, the main surfaces may be reworded as surfaces perpendicular to the thickness direction of the plate member.

Each of "buffer layers" mentioned above only needs to be a layer-like body that protects the main surface of the plate member from its surroundings, and the material forming the buffer layer and the thickness of the buffer layer are not particularly limited. For example, as the buffer layer, the layer-like body formed of an unwoven fabric may be used.

The working method of the end portion of the plate member of the invention has been described thus far. Next, "a manufacturing method for a plate member" of the invention will be described.

As can be understood from the description of "the working method for the end portion of the plate member" of the invention described above, by using the working method of the invention described above, it is possible to easily and reliably manufacture the plate member in which the beauty is improved and the sense of harm is reduced by properly working the end portion.

Specifically, the manufacturing method for the plate member of the invention for achieving the above object includes a step of cutting the plate member into a predetermined shape, and a step including a first working process of heating and pressing an end portion of the plate member in a thickness direction to form a thin portion, a second working process of folding the thin portion such that a pressed surface is positioned inside to move an outer peripheral end of the thin portion as an end portion on an outer peripheral side of the plate member to a vicinity of a main body portion of the plate member to which an inner end of the thin portion on an inner side of the plate member is connected, and a third working process of pressing the outer peripheral end of the thin portion in the thickness direction to move the outer peripheral end of the thin portion further inward than a surface of the main body portion in the thickness direction.

With the above configuration, it is possible to easily and reliably manufacture the plate member having a shape corresponding to its use and excellent from the viewpoint of improving the beauty and reducing the sense of harm.

As a first aspect of the manufacturing method for the plate member of the invention, the thin portion may be formed such that the pressed surface has a concave portion at a position around the inner end of the thin portion in the first working process.

Further, as a second aspect of the manufacturing method for the plate member of the invention, a portion of the main body portion present around the outer peripheral end of the thin portion may be pressed in the thickness direction together with the outer peripheral end of the thin portion in the third working process.

Further, as a third aspect of the manufacturing method for the plate member of the invention, only the outer peripheral end of the thin portion (or the portion around the outer peripheral end) may be pressed such that a concave portion in which the outer peripheral end of the thin portion is buried in the plate member is formed in the third working process.

Further, as a fourth aspect of the manufacturing method for the plate member of the invention, an entire portion of the thin portion including the outer peripheral end of the thin portion may be pressed in the thickness direction in the third working process.

In addition, as a fifth aspect of the manufacturing method for the plate member of the invention, buffer layers may be provided on respective main surfaces of the plate member.

With the individual aspects including the above configurations, it is possible to enhance the manufacturing method for the plate member of the invention from the viewpoint of the beauty of the plate member and the like.

Next, "a working apparatus for an end portion of a plate member" of the invention will be described.

As can be understood from the description of "the working method for the end portion of the plate member" of the invention described above, the working apparatus that executes the above working method of the invention is capable of easily and reliably manufacturing the plate member in which the beauty is improved and the sense of harm is reduced by properly working the end portion.

Specifically, the working apparatus for the end portion of the plate member of the invention for achieving the above object works the end portion of the plate member formed of a thermoplastic resin, and includes a first mechanism heating and pressing the end portion of the plate member in a thickness direction to form a thin portion, a second mechanism folding the thin portion such that a pressed surface is positioned inside to move an outer peripheral end of the thin portion as an end portion on an outer peripheral side of the plate member to a vicinity of a main body portion of the plate member to which an inner end of the thin portion as an end portion on an inner side of the plate member is connected, and a third mechanism pressing the outer peripheral end of the thin portion in the thickness direction to move the outer peripheral end of the thin portion further inward than a surface of the main body portion in the thickness direction.

With the above configuration, the working apparatus of the invention is capable of properly working the end portion of the resin plate member to easily and reliably manufacture the plate member excellent from the viewpoint of improving the beauty and reducing the sense of harm.

As a first aspect of the working apparatus for the end portion of the plate member of the invention, the first mechanism may form the thin portion such that the pressed surface has a concave portion at a position around the inner end of the thin portion.

Further, as a second aspect of the working apparatus for the end portion of the plate member of the invention, the third mechanism may press a portion of the main body portion present around the outer peripheral end of the thin portion in the thickness direction together with the outer peripheral end of the thin portion.

Further, as a third aspect of the working apparatus for the end portion of the plate member of the invention, the third mechanism may press only the outer peripheral end of the thin portion (or the portion around the outer peripheral end) such that a concave portion in which the outer peripheral end of the thin portion is buried in the plate member is formed.

Further, as a fourth aspect of the working apparatus for the end portion of the plate member of the invention, the third mechanism may press an entire portion of the thin portion including the outer peripheral end of the thin portion in the thickness direction.

In addition, as a fifth aspect of the working apparatus for the end portion of the plate member of the invention, buffer layers may be provided on respective main surfaces of the plate member.

With the individual aspects including the above configurations, it is possible to further enhance the working apparatus for the end portion of the plate member of the invention from the viewpoint of the beauty of the plate member and the like.

Next, "a plate member" of the invention will be described.

As can be understood from the description of "the working method for the end portion of the plate member" of the invention described above, the plate member having been subjected to the above working method of the invention has a properly worked end portion-worked structure, and is excellent from the viewpoint of improving the beauty and reducing the sense of harm.

Specifically, the plate member of the invention for achieving the above object is formed of a thermoplastic resin and includes an end portion-worked structure in which an end portion is worked, and the end portion-worked structure is a structure having a main body portion of the plate member and a portion in which a thin portion extending from the main body portion is curved, and is a structure in which the thin portion is curved such that a tip portion of the thin portion is moved to a vicinity of the main body portion, and the tip portion of the thin portion is moved further inward than a surface of the main body portion in a thickness direction.

With the above configuration, the plate member of the invention has the properly worked end portion, is excellent in beauty, and is capable of reducing the sense of harm.

As one aspect of the plate member of the invention, the end portion-worked structure may include a structure in which a portion of the main body portion present around the tip portion of the thin portion is moved further inward than the surface of the main body portion in the thickness direction together with the tip portion of the thin portion.

Further, as another aspect of the plate member of the invention, buffer layers may be provided on respective main surfaces of the plate member.

With the individual aspects including the above configurations, it is possible to further enhance the plate member of the invention from the viewpoint of the beauty and the like.

As has been described thus far, "the working method for the end portion of the plate member" of the invention achieves an effect of being able to prevent the end portion (the cut surface) of the resin plate member from being exposed on the surface of the resin plate member as easily and reliably as possible. In addition, "the manufacturing method for the plate member" of the invention achieves an effect of being able to easily and reliably manufacture the plate member in which the beauty is improved and the sense of harm is reduced by properly working the end portion. Further, "the working apparatus for the end portion of the plate member" of the invention achieves an effect of being able to easily and reliably implement an improvement in the beauty of the plate member and a reduction in the sense of harm by properly working the end portion of the plate member. In addition, "the plate member" of the invention achieves an effect that the beauty is excellent and the sense of harm is small.

MODES FOR CARRYING OUT THE INVENTION

Hereinbelow, a description will be given of embodiments of a working method for an end portion of a plate member of the invention, a manufacturing method for a plate member of the invention, a working apparatus for an end portion of a plate member of the invention, and a plate member of the invention with reference to the drawings.

First Embodiment

First, a first embodiment of the invention will be described.

Figure 1:
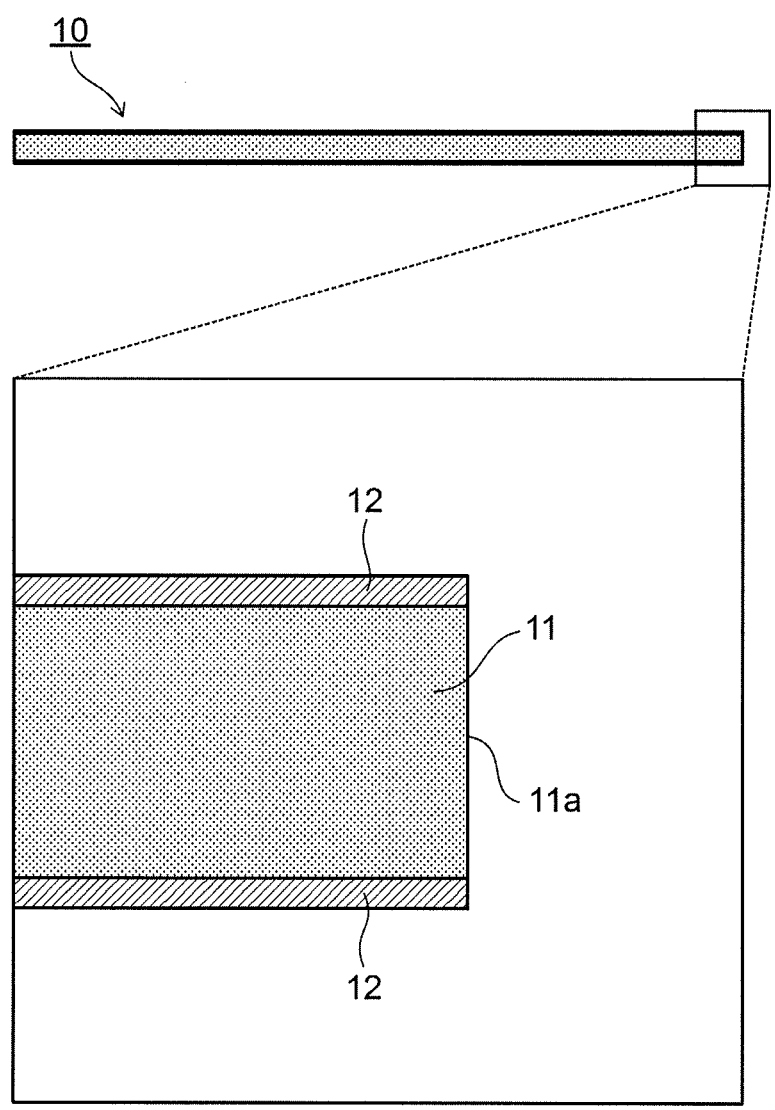
FIG. 1 is a schematic cross-sectional view showing an example of a plate member to which a working method of the invention is applied.

FIG. 1 shows a schematic configuration of a plate member (a plate member before being worked) to which a working method (a first working method) according to the embodiment is applied. As shown in FIG. 1, a plate member 10 includes a plate-shaped body 11, and buffer layers 12 provided on surfaces (two main surfaces) of the plate-shaped body 11. The plate-shaped body 11 is formed of a thermoplastic resin, and the buffer layer 12 is formed of a nonwoven fabric. An end surface 11a of the plate-shaped body 11 is a cut surface formed when the plate member 10 is worked into a shape suitable for its use.

Figure 2:
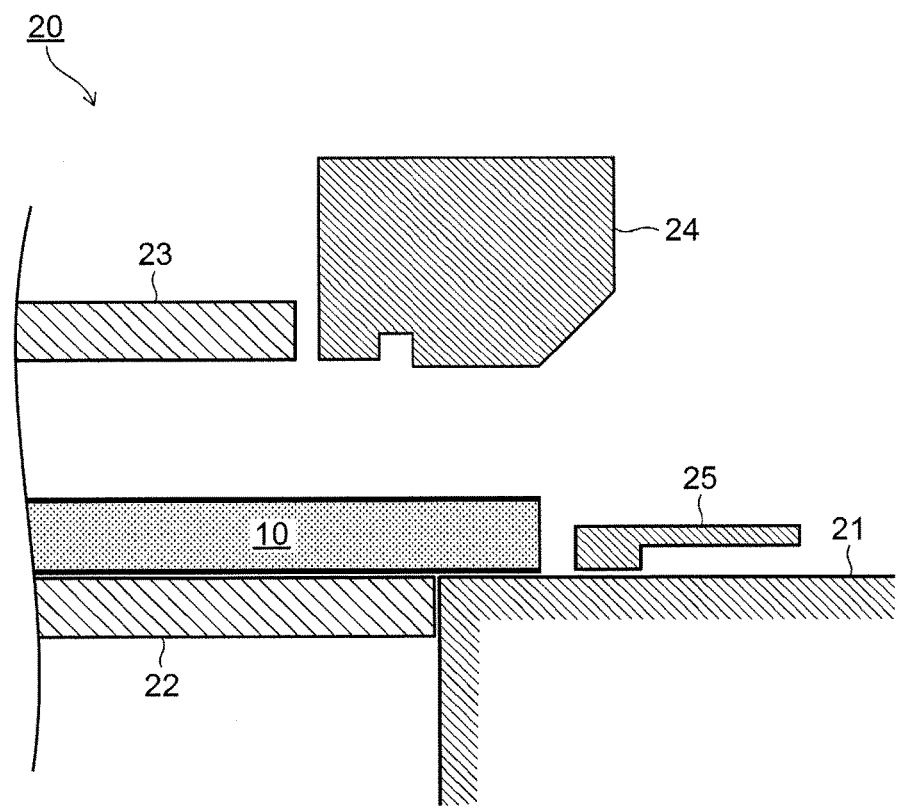
FIG. 2 is a schematic view showing a first embodiment of a working apparatus of the invention.

FIG. 2 shows a schematic configuration of a working apparatus 20 (a first working apparatus. Hereinafter referred to as "an apparatus 20".) according to the embodiment. As shown in FIG. 2, the apparatus 20 includes a stationary lower pad 21, a movable lower pad 22, a movable upper pad 23, a heated blade 24, and a slide cam 25.

Hereinbelow, with reference to FIGS. 2 to 8, procedures for performing the working method (the first working method) according to the embodiment on the plate member 10 will be described. In other words, based on FIGS. 2 to 8, a manufacturing method (a first manufacturing method) of the plate member of the embodiment, a working apparatus (a first working apparatus) of the end portion of the plate member according to the embodiment, and, by extension, a plate member (a first plate member) according to the embodiment will be described. In the embodiment, the plate member 10 is worked according to procedures 1 to 7 described later in this order. Note that, hereinbelow, up • down • left • right directions on each paper sheet in each drawing are referred to as "an up direction" • "a down direction" • "a left direction" • "a right direction".

Procedure 1 (Placement of Plate Member)

As shown in FIG. 2, the stationary lower pad 21 and the movable lower pad 22 are disposed such that upper surfaces thereof constitute one plane (i.e., flush with each other). Subsequently, the plate member 10 is placed on the plane. At this point, the plate member 10 is disposed such that an end portion of the plate member 10 having a predetermined length is positioned on the stationary lower pad 21. The predetermined length is determined based on a preliminary experiment result so as to be suitable for formation and working of a thin portion (10a described later) of the plate member 10 in subsequent procedures 2 to 7.

Procedure 2 (Heating and Pressing of End Portion • Formation of Thin Portion 1)

Figure 3:
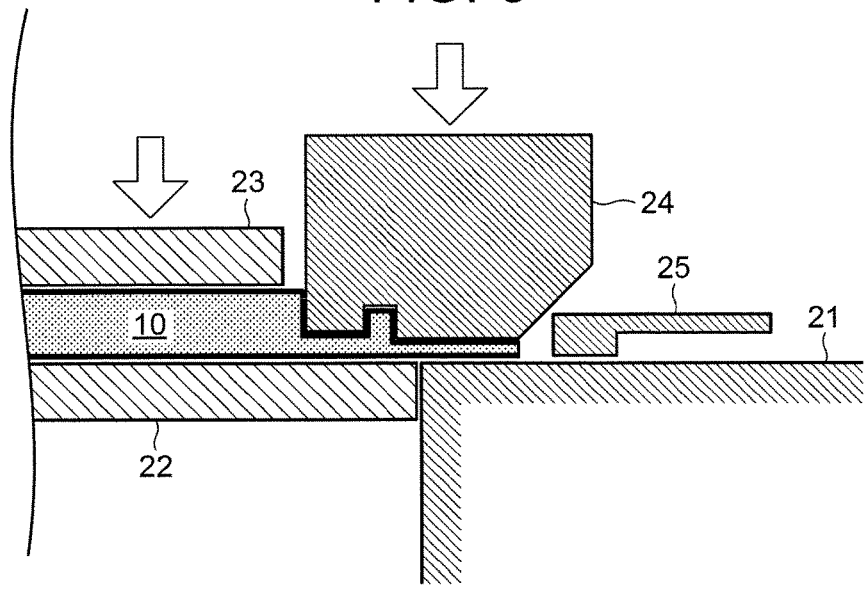
FIG. 3 is a schematic view showing a procedure for working an end portion of the plate member.

As shown in FIG. 3, the movable upper pad 23 and the heated blade 24 are moved toward the plate member 10 in the down direction. Subsequently, the end portion of the plate member 10 is heated and pressed by the heated blade 24 in a thickness direction while the plate member 10 is held between and fixed by the movable lower pad 22 and the movable upper pad 23. With this, the thin portion (corresponds to 10a in FIG. 4) is formed at the end portion of the plate member 10. Note that the thickness direction of the plate member 10 corresponds to an up and down direction in FIG. 3. The same applies to the following description.

Procedure 3 (Heating and Pressing of End Portion • Formation of Thin Portion 2)

Figure 4:
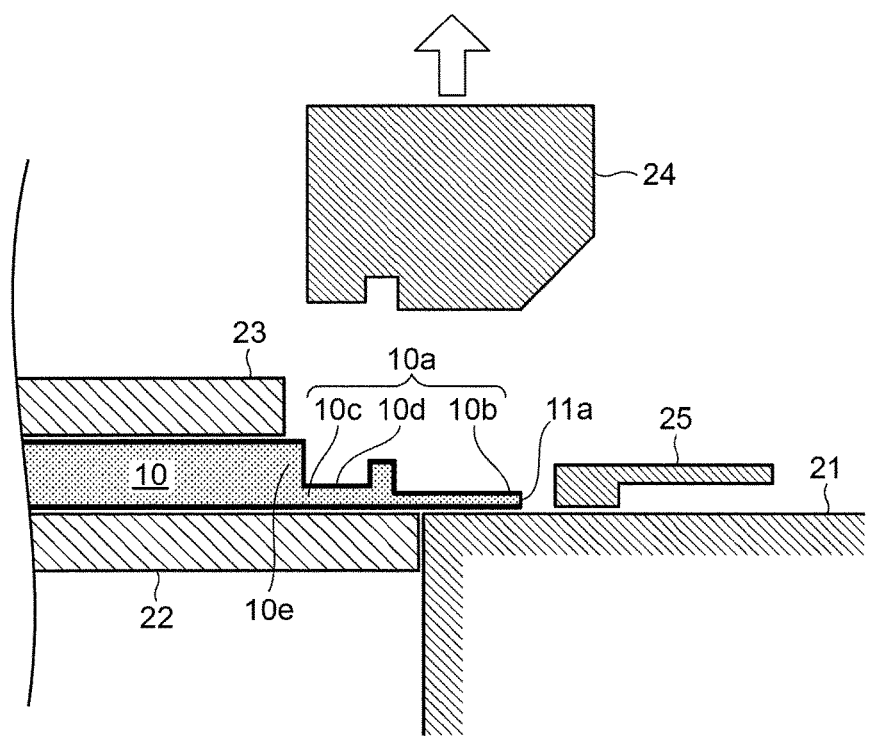
FIG. 4 is a schematic view showing a procedure for working the end portion of the plate member.

As shown in FIG. 4, the heated blade 24 is moved in the up direction while the state in which the plate member 10 is fixed is maintained. The thin portion 10a formed by the heated blade 24 has an end portion (an outer peripheral end) 10b on an outer peripheral side of the plate member 10, an end portion (an inner end) 10c on an inner side of the plate member 10, and a concave portion 10d formed in a pressed surface (a surface of the thin portion 10a in the up direction) around the inner end 10C. The thin portion 10a is connected to a main body portion 10e of the plate member 10 at the inner end 10c. That is, the thin portion 10a extends from the main body portion 10e of the plate member 10 in a direction toward an outer periphery (the end surface 11a) of the plate member 10.

Procedure 4 (Folding of Thin Portion 1)

Figure 5:
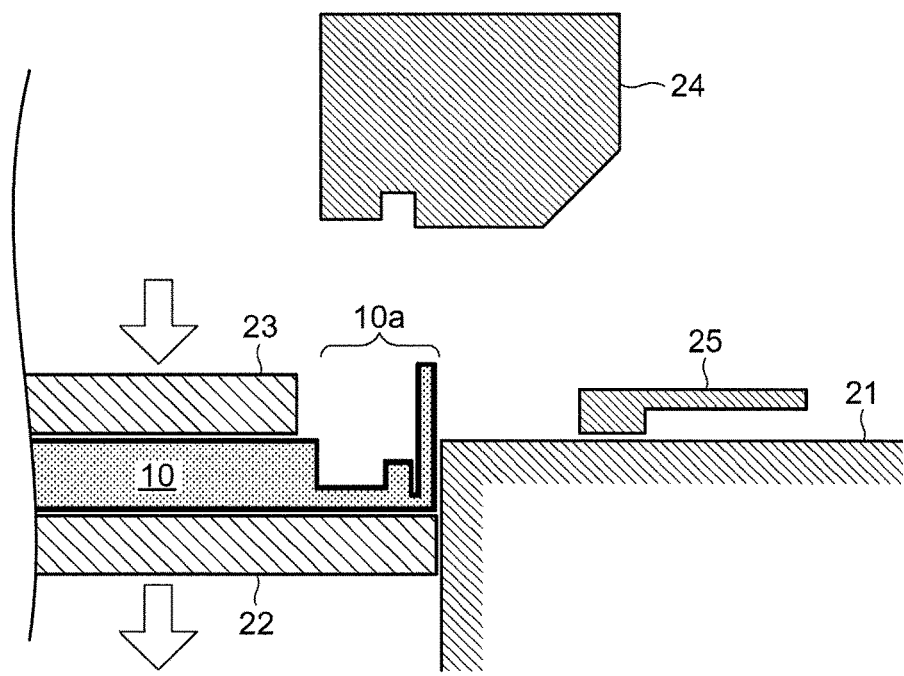
FIG. 5 is a schematic view showing a procedure for working the end portion of the plate member.

As shown in FIG. 5, the movable lower pad 22 and the movable upper pad 23 are moved in the down direction while the state in which the plate member 10 is held between the movable lower pad 22 and the movable upper pad 23 is maintained. At this point, the stationary lower pad 21 is not moved. With this, the thin portion 10a is bent in the up direction by the stationary lower pad 21 while being moved in the down direction together with the movable lower pad 22 and the movable upper pad 23.

Note that, the procedure 4 is performed while retained heat in the procedure 1 still remains in the thin portion 10a (i.e., while the thin portion 10a has plasticity that allows deformation of the thin portion 10a). The same applies to the procedure 5 and the procedure 6 described later.

Procedure 5 (Folding of Thin Portion 2)

Figure 6:
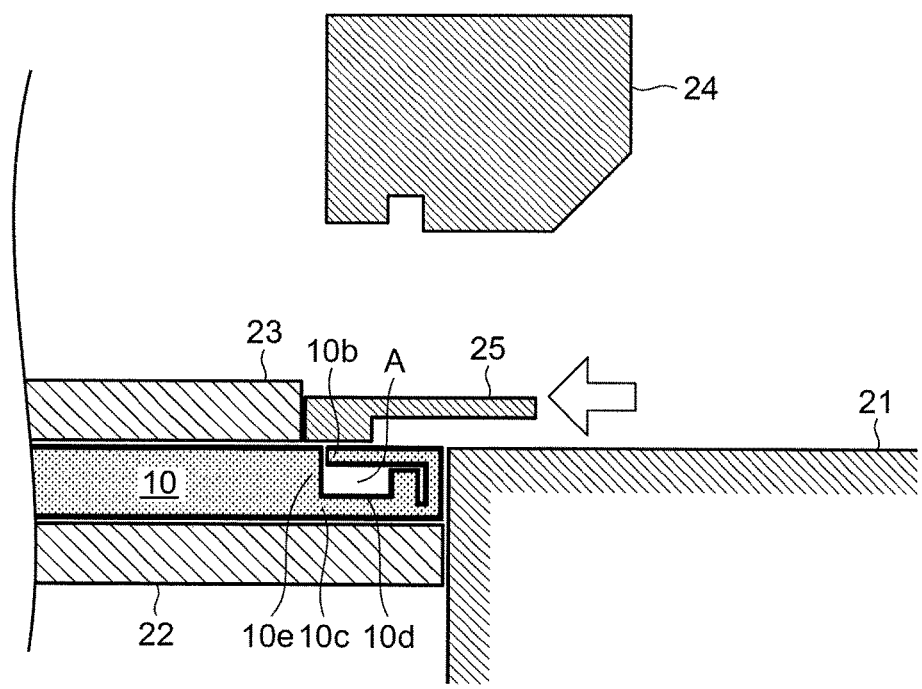
FIG. 6 is a schematic view showing a procedure for working the end portion of the plate member.

As shown in FIG. 6, the slide cam 25 is moved in the left direction while the state in which the plate member 10 is fixed is maintained. With this, the thin portion is further bent in the left direction by the slide cam 25, and the outer peripheral end 10b of the thin portion is moved to the vicinity of the main body portion 10e (in other words, to the vicinity of the inner end 10c). Thus, with the procedure 4 and the procedure 5, the thin portion 10a (see FIG. 2) is folded such that the pressed surface is positioned inside. At this point, a gap A formed by the concave portion 10d is near the outer peripheral end 10b of the thin portion 10a (e.g., between the outer peripheral end 10b and the inner end 10c).

Note that, in the procedure, a tip portion (an end portion in the left direction) of the slide cam 25 advances to a position that covers not only the outer peripheral end 10b of the thin portion 10a but also a portion of the main body portion 10e present around the outer peripheral end 10b.

Procedure 6 (Movement of Outer Peripheral End of Thin Portion)

Figure 7:
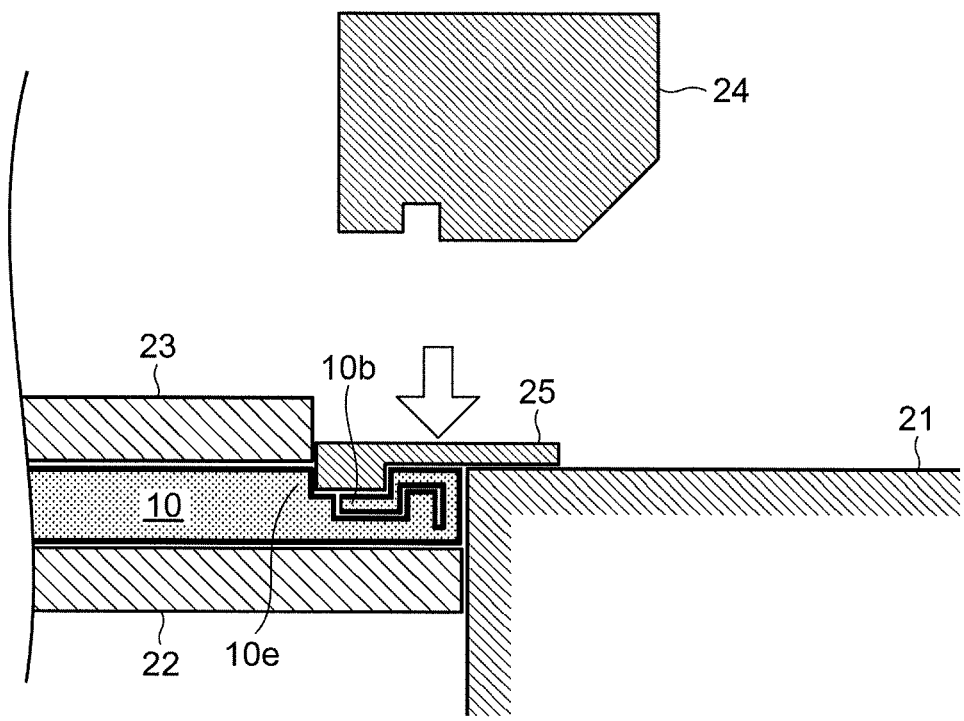
FIG. 7 is a schematic view showing a procedure for working the end portion of the plate member.

As shown in FIG. 7, the slide cam 25 is moved in the down direction while the state in which the plate member 10 is fixed is maintained. That is, the slide cam 25 is pressed against the plate member 10 that is fixed so as not to be movable.

With this, the portion of the main body portion 10e present around the outer peripheral end 10b is pressed in the thickness direction of the plate member 10 together with the outer peripheral end 10b of the thin portion. At this point, the outer peripheral end 10b of the thin portion (and part of the main body portion 10e) enters the gap A shown in FIG. 6. Note that the gap A is filled with the outer peripheral end 10b of the thin portion and the like, and hence the gap A is not depicted in FIG. 7.

With the procedure, the outer peripheral end 10b of the thin portion is moved further inward than a surface (10f in FIG. 8) of the main body portion 10e in the thickness direction, and the portion of the main body portion 10e present around the outer peripheral end 10b is also moved further inward than the surface of the main body portion 10e in the thickness direction. As a result, a concave portion in which the outer peripheral end 10b of the thin portion is buried in the plate member 10 is formed (the detail thereof will be described later).

Procedure 7 (Extraction of Plate Member)

The plate member 10 having been worked according to the above procedures 1 to 6 (i.e., the first plate member according to the embodiment) is disconnected from the apparatus 20. Note that depiction of the mode of the disconnection will be omitted.

Figure 8:
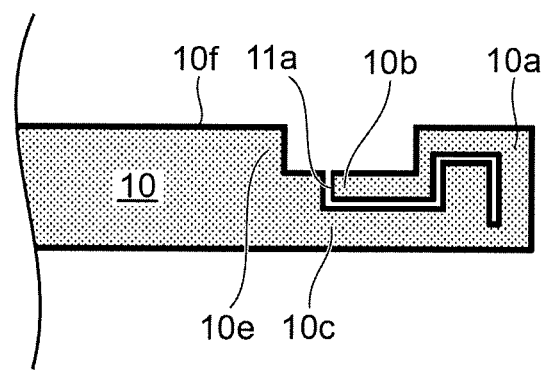
FIG. 8 is a partially enlarged view showing an end portion-worked structure of a plate member manufactured according to a first embodiment of the working method of the invention.

FIG. 8 is a partially enlarged view of the end portion of the plate member 10 manufactured according to the first working method according to the embodiment. The plate member 10 after the working includes an end portion-worked structure shown in FIG. 8. Specifically, the end portion-worked structure is a structure in which the thin portion 10a is curved such that the tip portion (the outer peripheral end 10b) of the thin portion 10a is moved to the vicinity of the main body portion (the main body portion 10e), and the tip portion (the outer peripheral end 10b) of the thin portion 10a is moved further inward than the surface 10f of the main body portion (the main body portion 10e) in the thickness direction of the plate member 10 (specifically, the tip portion is buried in the plate member 10 concavely).

With this, the end surface 11a (the cut surface) formed when the plate member 10 is worked is prevented from being exposed on the surface (10f) of the plate member 10. With this, it is possible to improve beauty of the plate member 10 and reduce a sense of harm.

Second Embodiment

Next, a second embodiment of the invention will be described.

Main differences between the second embodiment and the first embodiment are (1) the entire portion of the thin portion including the outer peripheral end of the thin portion is pressed, and (2) the slide cam is fixed so as not to be movable and the thin portion is pressed against the slide cam in the procedure for pressing the outer peripheral end of the folded thin portion (the procedure 6 described above).

Hereinbelow, procedures for performing a working method (a second working method) according to the embodiment on the plate member will be described with reference to FIGS. 9 to 15 with the above differences being described mainly. In other words, based on FIGS. 9 to 15, a manufacturing method (a second manufacturing method) of the plate member of the embodiment, a working apparatus (a second working apparatus) of the end portion of the plate member according to the embodiment, and, by extension, a plate member (a second plate member) according to the embodiment will be described.

The working method (the second working method) according to the embodiment can be applied to the same plate member as the plate member 10 to which the working method (the first working method) according to the first embodiment is applied (see FIG. 1).

Figure 9:
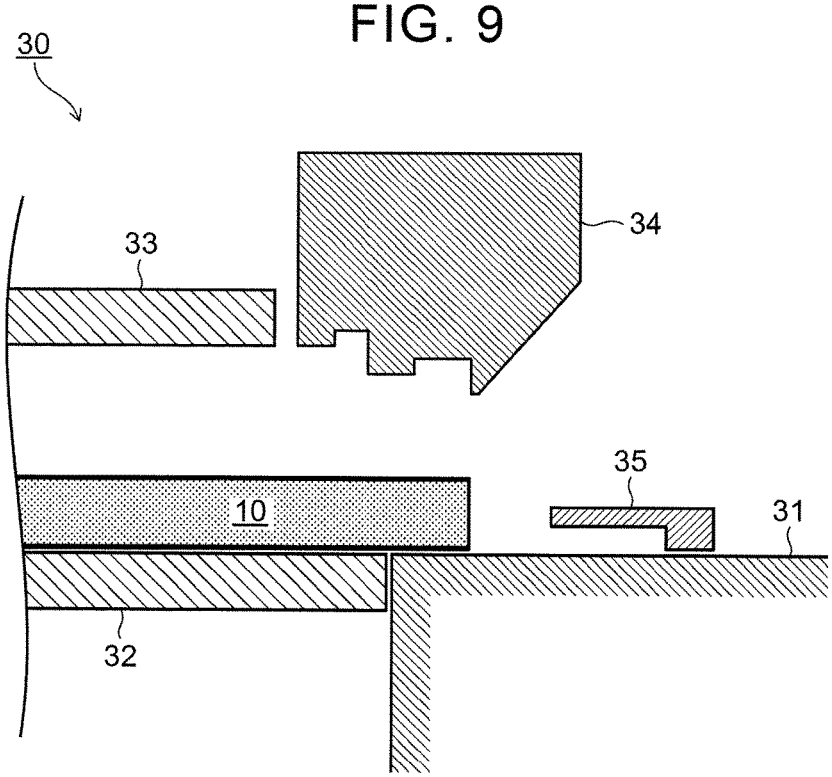
FIG. 9 is a schematic view showing a second embodiment of the working apparatus of the invention.

FIG. 9 shows a schematic configuration of a working apparatus 30 (the second working apparatus. Hereinafter referred to as "an apparatus 30") according to the embodiment. Similarly to the working apparatus 20 according to the first embodiment, the apparatus 30 includes a stationary lower pad 31, a movable lower pad 32, a movable upper pad 33, a heated blade 34, and a slide cam 35. Procedures for performing the working method (the second working method) according to the embodiment on the plate member 10 are as follows.

Procedure 1 (Placement of Plate Member)

As shown in FIG. 9, the plate member 10 is disposed on a plane constituted by the stationary lower pad 31 and the movable lower pad 32.

Procedure 2 (Heating and Pressing of End Portion • Formation of Thin Portion 1)

Figure 10:
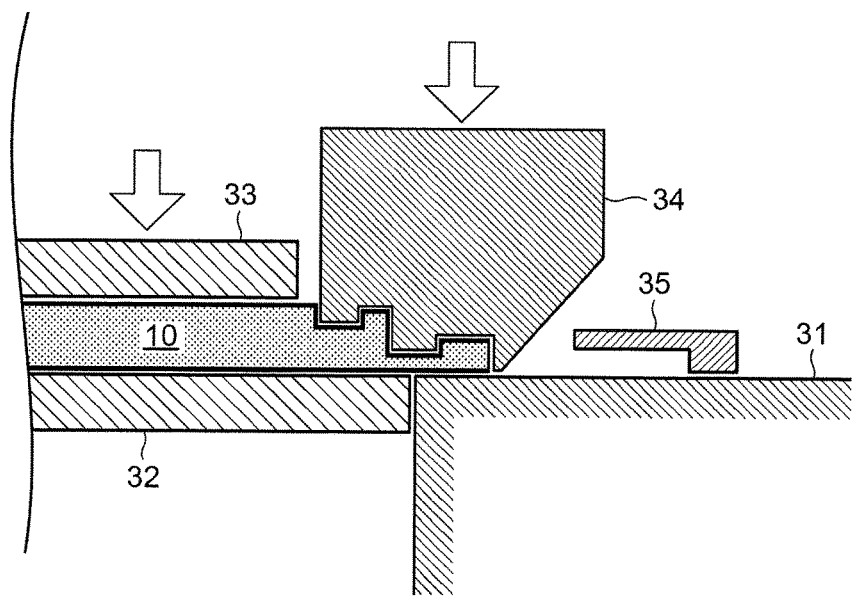
FIG. 10 is a schematic view showing a procedure for working the end portion of the plate member.

As shown in FIG. 10, the heated blade 34 is moved in the down direction and the end portion of the plate member 10 is heated and pressed in the thickness direction while the movable upper pad 33 is moved in the down direction and the plate member 10 is thereby fixed. With this, the thin portion (corresponds to 10a in FIG. 11) is formed at the end portion of the plate member 10.

Procedure 3 (Heating and Pressing of End Portion • Formation of Thin Portion 2)

Figure 11:
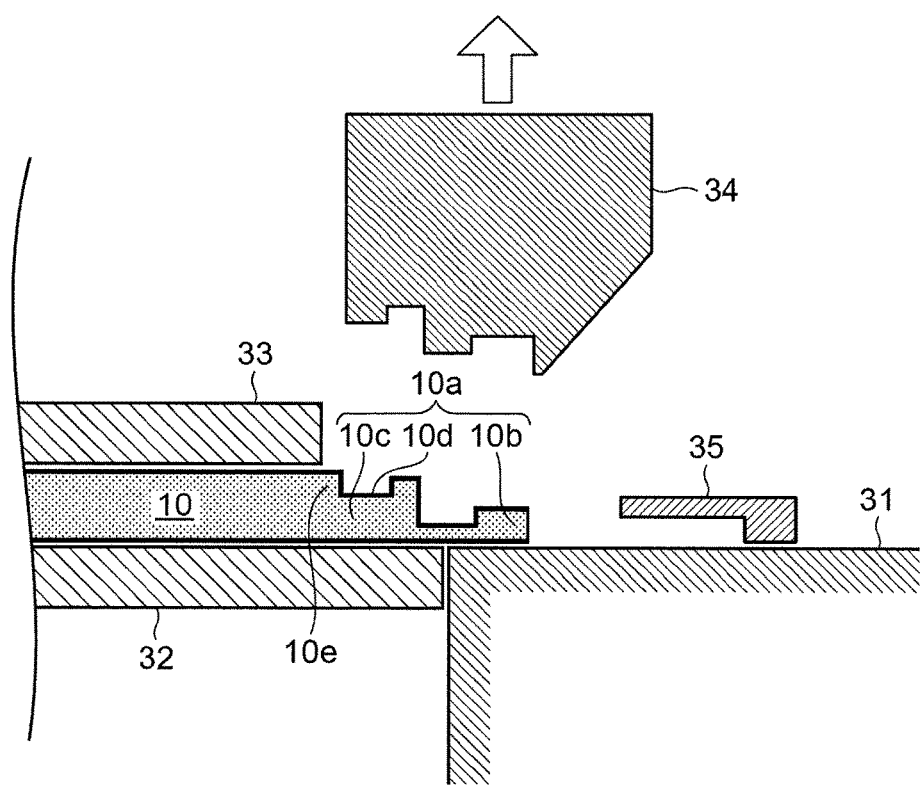
FIG. 11 is a schematic view showing a procedure for working the end portion of the plate member.

As shown in FIG. 11, the heated blade 34 is moved in the up direction. The thin portion 10a has the end portion (the outer peripheral end) 10b on the outer peripheral side of the plate member 10, the end portion (the inner end) 10c on the inner side of the plate member 10, and the concave portion 10d formed in the pressed surface around the inner end 10c.

Procedure 4 (Folding of Thin Portion 1)

Figure 12:
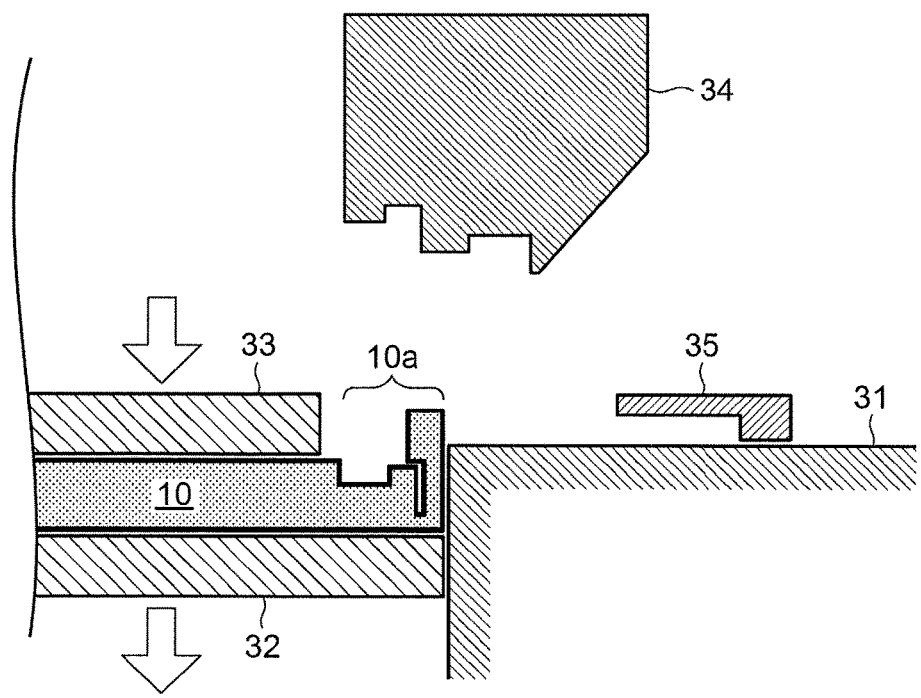
FIG. 12 is a schematic view showing a procedure for working the end portion of the plate member.

As shown in FIG. 12, the movable lower pad 32 and the movable upper pad 33 are moved in the down direction while the state in which the plate member 10 is held between the movable lower pad 32 and the movable upper pad 33 is maintained. With this, the thin portion 10a is bent in the up direction.

Procedure 5 (Folding of Thin Portion 2)

Figure 13:
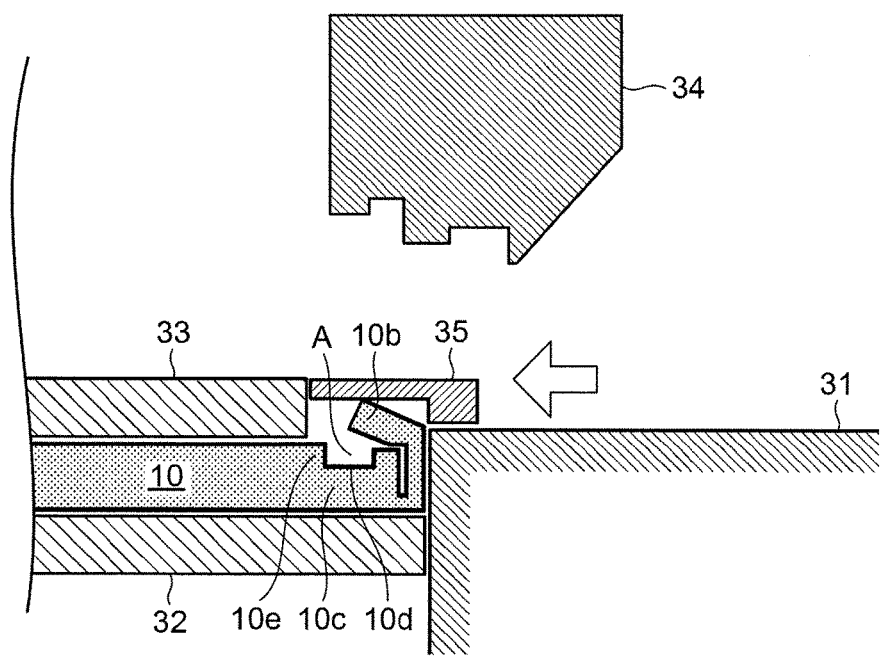
FIG. 13 is a schematic view showing a procedure for working the end portion of the plate member.

As shown in FIG. 13, the slide cam 35 is moved in the left direction while the state in which the plate member 10 is fixed is maintained. At this point, a tip portion (an end portion in the left direction) of the slide cam 35 advances to a position that covers not only the outer peripheral end 10b of the thin portion but also a portion of the main body portion 10e present around the outer peripheral end 10b. With this, the thin portion is further bent in the left direction by the slide cam 35, and the outer peripheral end 10b of the thin portion is moved to the vicinity of the main body portion 10e (in other wards, to the vicinity of the inner end 10c).

Therefore, with the procedure 4 and the procedure 5, the thin portion 10a (see FIG. 9) is folded such that the pressed surface is positioned inside. At this point, the gap A formed by the concave portion 10d is present near the outer peripheral end 10b of the thin portion 10a (e.g., between the outer peripheral end 10b and the inner end 10c).

Procedure 6 (Movement of Outer Peripheral End of Thin Portion)

Figure 14:
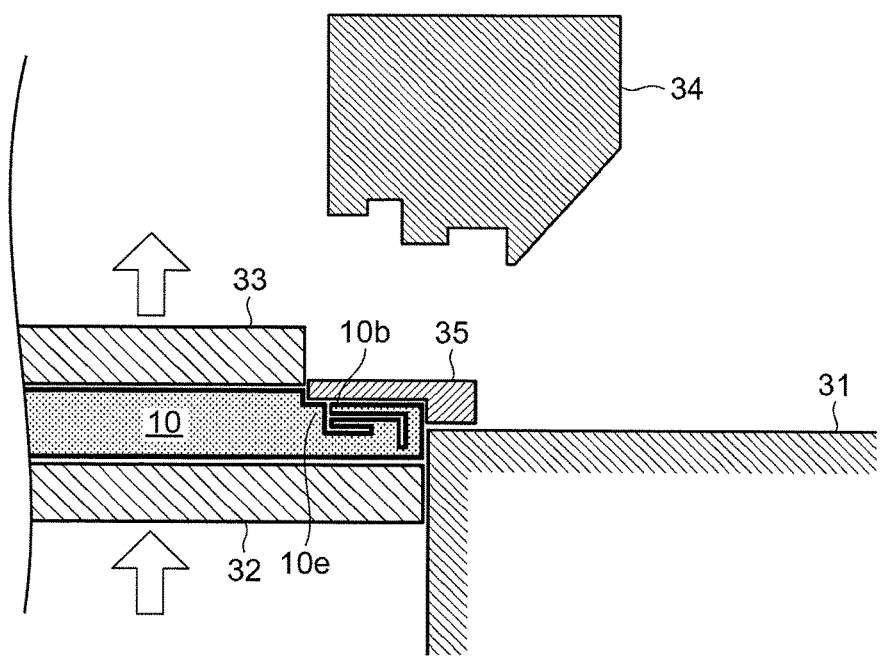
FIG. 14 is a schematic view showing a procedure for working the end portion of the plate member.

As shown in FIG. 14, the movable lower pad 32 and the movable upper pad 33 are moved in the up direction while a state in which the slide cam 35 is fixed and the plate member 10 is held between the movable lower pad 32 and the movable upper pad 33 is maintained. That is, the plate member 10 is pressed against the slide cam 35 that is fixed so as not to be movable.

With this, the portion of the main body portion 10e present around the outer peripheral end 10b is pressed in the thickness direction of the plate member 10 together with the entire portion of the thin portion including the outer peripheral end 10b of the thin portion. Therefore, the entire portion of the thin portion including the outer peripheral end 10b of the thin portion is moved further inward than the surface (10f in FIG. 15) of the main body portion 10e in the thickness direction, and the portion of the main body portion 10e present around the outer peripheral end 10b is also moved further inward than the surface of the main body portion 10e in the thickness direction. As a result, a flat portion having a thickness smaller than that of the main body portion 10e is formed around the plate member 10 (the detail thereof will be described later).

Procedure 7 (Extraction of Plate Member)

The plate member 10 having been worked according to the above procedures 1 to 6 (i.e., the second plate member according to the embodiment) is disconnected from the apparatus 30.

Figure 15:
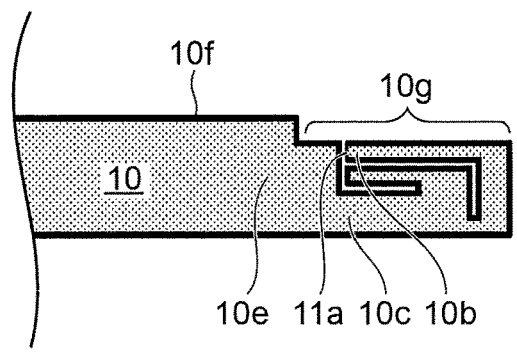
FIG. 15 is a partially enlarged view showing an end portion-worked structure of a plate member manufactured according to a second embodiment of the working method of the invention.

FIG. 15 is a partially enlarged view of the end portion of the plate member 10 manufactured according to the second working method according to the embodiment. The plate member 10 after the working includes an end portion-worked structure shown in FIG. 15. Specifically, the end portion-worked structure is a structure in which the thin portion 10a is curved such that the tip portion (the outer peripheral end 10b) of the thin portion 10a is moved to the vicinity of the main body portion (the main body portion 10e), and the tip portion (the outer peripheral end 10b) of the thin portion 10a is moved further inward than the surface 10f of the main body portion (the main body portion 10e) in the thickness direction of the plate member 10 (specifically, a flat portion 10g having a thickness smaller than that of the main body portion 10e is present around the plate member 10).

With this, the end surface 11a (the cut surface) of the plate member 10 is prevented from being exposed on the surface (100 of the plate member 10, and it is possible to improve the beauty of the plate member 10 and reduce the sense of harm.

The foregoing is the description of the embodiments of the working method for the end portion of the plate member of the invention, the manufacturing method for the plate member of the invention, the working apparatus for the end portion of the plate member of the invention, and the plate member of the invention. Note that, each of FIGS. 5 to 8 and FIGS. 10 to 15 (and FIGS. 16 and 17 described later) depicts a small gap present between the pressed surfaces of the thin portion 10a. However, the gap is only an expression for the sake of convenience of facilitation of understanding of the embodiments, and the gap need not necessarily be present actually.

Note that, in the plate member 10 having been subjected to the above-described working method, a surface on the same side as the pressed surface of the thin portion 10a (a surface in the up direction in each of FIG. 8 and FIGS. 15 to 17) is used as "a back surface", and a surface on the opposite side of the pressed surface of the thin portion 10a (a surface in the down direction in each of FIG. 8 and FIGS. 15 to 17) is used as "a front surface" (what is called a design surface) in many cases.

SUMMARY OF EMBODIMENTS

"The working method for the end portion of the plate member" according to each of the above embodiments (the first embodiment and the second embodiment) is used when the end portion 11a (the cut surface) of the plate member 10 formed of the thermoplastic resin is worked.

The working method of each of the above embodiments includes a first step (the procedures 2 and 3) of heating and pressing the end portion of the plate member 10 in the thickness direction to form the thin portion 10a, a second step (the procedures 4 and 5) of folding the thin portion 10a such that the pressed surface is positioned inside to move the outer peripheral end 10b of the thin portion 10a as the end portion on the outer peripheral side of the plate member to the vicinity of the main body portion 10e of the plate member 10 to which the inner end 10c of the thin portion 10a as the end portion on the inner side of the plate member is connected, and a third step (the procedure 6) of pressing the outer peripheral end 10b of the thin portion in the thickness direction to move the outer peripheral end 10b of the thin portion further inward than the surface 10f of the main body portion in the thickness direction.

Herein, in the first step (the procedures 2 and 3), the thin portion 10a is formed such that the pressed surface (the surface in the up direction in each of FIGS. 4 and 11) has the concave portion 10d at the position around the inner end 10c of the thin portion.

Further, in the third step (the procedure 6), the portion of the main body portion 10e present around the outer peripheral end 10b of the thin portion is pressed in the thickness direction together with the outer peripheral end 10b of the thin portion.

At this point, the outer peripheral end 10b of the thin portion may be pressed such that the concave portion in which the outer peripheral end 10b of the thin portion is buried in the plate member 10 is formed (the first embodiment), and the entire portion of the thin portion 10a including the outer peripheral end 10b of the thin portion may be pressed in the thickness direction, and the flat portion 10g may be formed (the second embodiment).

Note that the buffer layers (nonwoven fabric layers 12) are provided on respective main surfaces (the surface in the up direction and the surface in the down direction in FIG. 1) of the plate member 10.

On the other hand, "the manufacturing method for the plate member" according to each of the above embodiments includes a step of cutting the plate member 10 into the predetermined shape (see FIG. 1), and a step including a first working process (the procedures 2 and 3) of heating and pressing the end portion of the plate member 10 in the thickness direction to form the thin portion 10a, a second working process (the procedures 4 and 5) of folding the thin portion 10a such that the pressed surface is positioned inside to move the outer peripheral end 10b of the thin portion 10a as the end portion on the outer peripheral side of the plate member 10 to the vicinity of the main body portion 10e of the plate member 10 to which the inner end 10c of the thin portion 10a as the end portion on the inner side of the plate member 10, and a third working process (the procedure 6) of pressing the outer peripheral end 10b of the thin portion in the thickness direction to move the outer peripheral end 10b of the thin portion further inward than the surface 10f of the main body portion in the thickness direction.

Herein, in the first working process (the procedures 2 and 3), the thin portion 10a is formed such that the pressed surface has the concave portion at the position around the inner end 10c of the thin portion. In addition, in the third working process (the procedure 6), the portion of the main body portion 10e present around the outer peripheral end 10b of the thin portion is pressed in the thickness direction together with the outer peripheral end 10b of the thin portion. At this point, the outer peripheral end 10b of the thin portion may be pressed such that the concave portion in which the outer peripheral end 10b of the thin portion is buried in the plate member 10 is formed (the first embodiment), and the entire portion of the thin portion 10a including the outer peripheral end 10b of the thin portion may be pressed in the thickness direction and the flat portion 10g may be formed (the second embodiment).

Further, "the working apparatus for the end portion of the plate member" according to each of the above embodiments is the apparatus 20 or 30 that works the end portion of the plate member 10, and includes a first mechanism (e.g., the heated blade 24) that heats and presses the end portion of the plate member in the thickness direction to form the thin portion 10a, a second mechanism (e.g., the stationary lower pad 21, the movable lower pad 22, and the movable upper pad 23) that folds the thin portion 10a such that the pressed surface is position inside to move the outer peripheral end 10b of the thin portion 10a as the end portion on the outer peripheral side of the plate member to the vicinity of the main body portion 10e of the plate member to which the inner end 10c of the thin portion 10a as the end portion on the inner side of the plate member is connected, and a third mechanism (e.g., the slide cam 25) that presses the outer peripheral end 10b of the thin portion in the thickness direction to move the outer peripheral end 10b of the thin portion further inward than the surface 10f of the main body portion in the thickness direction.

Herein, the first mechanism 24 forms the thin portion 10a such that the pressed surface has the concave portion 10d at the position around the inner end 10c of the thin portion. In addition, the third mechanism 21, 22, and 23 presses the portion of the main body portion 10e present around the outer peripheral end 10b of the thin portion in the thickness direction together with the outer peripheral end 10b of the thin portion. At this point, the outer peripheral end 10b of the thin portion may be pressed such that the concave portion in which the outer peripheral end 10b of the thin portion is buried in the plate member 10 is formed (the first embodiment), and the entire portion of the thin portion 10a including the outer peripheral end 10b of the thin portion may be pressed in the thickness direction and the flat portion 10g may be formed (the second embodiment).

In addition, "the plate member" according to each of the above embodiments is the plate member (the plate member 10 after the working. FIGS. 8 and 15) that includes the end portion-worked structure in which the end portion is worked, and the end portion working structure is the structure having the main body portion 10e of the plate member 10 and the portion in which the thin portion 10a extending from the main body portion 10e is curved, and is configured such that the thin portion 10a is curved such that the tip portion (the outer peripheral end 10b) of the thin portion 10a is moved to the vicinity of the main body portion 10e, and the tip portion 10b of the thin portion 10a is moved further inward than the surface 10f of the main body portion in the thickness direction.

Herein, the end portion-worked structure is configured such that the portion of the main body portion 10e present around the tip portion 10b of the thin portion is moved further inward than the surface 10f of the main body portion 10e in the thickness direction together with the tip portion 10b of the thin portion.

Other Aspects

The invention is not limited to the above embodiments, and various modifications can be adopted within the scope of the invention.

For example, the plate member 10 of each of the embodiments described above has the solid resin plate member as the plate-shaped body 11. However, the working method and the manufacturing method of the invention may also be applied to the plate member that includes resin cardboard as the plate-shaped body 11.

Further, in the procedure 2 of each of the embodiments described above, the concave portion 10d is formed in the pressed surface around the inner end 10c of the thin portion 10a. However, each of the working method and the manufacturing method of the invention may be configured such that the thin portion 10a that does not have the concave portion 10d is formed.

Figure 16:
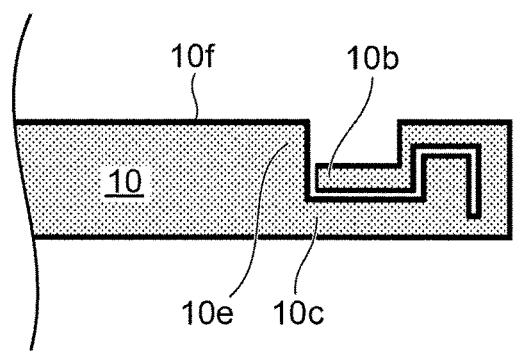
FIG. 16 is a partially enlarged view showing an end portion-worked structure of a plate member manufactured according to another embodiment of the working method of the invention.
Figure 17:
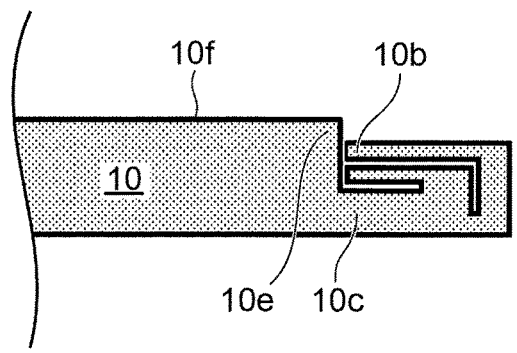
FIG. 17 is a partially enlarged view showing an end portion-worked structure of a plate member manufactured according to another embodiment of the working method of the invention.

Furthermore, in the procedure 6 of each of the embodiments described above, the outer peripheral end 10b of the thin portion 10a and the portion of the main body portion 10e present around the outer peripheral end 10b are pressed and moved. However, as shown in FIGS. 16 and 17, each of the working method and the manufacturing method of the invention may be configured such that only the outer peripheral end 10b of the thin portion 10a is pressed and is moved further inward than the surface 10f of the main body, portion in the thickness direction.

Specifically, for example, in the procedure 5 of the first embodiment, the tip portion of the slide cam 25 may be caused to advance to a position that covers only the outer peripheral end 10b of the thin portion 10a and, in the procedure 6, only the outer peripheral end 10b of the thin portion 10a may be pressed by the slide cam 25. Similarly, for example, in the procedure 5 of the second embodiment, the tip portion of the slide cam 35 may be caused to advance to a position that covers only the outer peripheral end 10b of the thin portion 10a and, in the procedure 6, only the outer peripheral end 10b of the thin portion 10a may be pressed against the slide cam 35.

INDUSTRIAL APPLICABILITY

The invention can be used as the working method for the end portion of the resin plate member capable of preventing the end portion (the cut surface) of the resin plate member from being exposed on the surface of the resin plate member as easily and reliably as possible, the manufacturing method for the plate member that uses the working method, the working apparatus that uses the working method, and the plate member that has the end portion-worked structure worked according to the working method.

10 . . . plate member, 11 . . . plate-shaped body, 12 . . . buffer layer, 10a . . . thin portion, 10b . . . outer peripheral end, 10c . . . inner end, 10d . . . concave portion, 10e . . . main body portion, 10f . . . surface of main body portion, 10g . . . flat portion

What is claimed is:

1. A working method for an end portion of a plate member formed of a thermoplastic resin, comprising:
    heating and pressing the end portion of the plate member in a thickness direction to form a thin portion, the thin portion being formed such that a pressed surface of the thin portion has a recessed portion at a position adjacent to an inner end of the thin portion on an inner side of the plate member;
    folding the thin portion to move an outer peripheral end of the thin portion on an outer peripheral side of the plate member to a vicinity of a main body portion of the plate member to which the inner end of the thin portion is connected; and
    pressing an outer surface of a first portion of the outer peripheral end of the thin portion in the thickness direction to move the outer peripheral end of the thin portion further inward than a surface of the main body portion in the thickness direction, such that the outer surface of the first portion of the outer peripheral end is moved further inward in the thickness direction than an outer surface of a second portion of the outer peripheral end.

2. The working method for an end portion of a plate member according to claim 1, wherein
    by pressing the outer peripheral end of the thin portion in the thickness direction, a portion of the main body portion adjacent to the outer peripheral end of the thin portion is pressed in the thickness direction together with the outer peripheral end of the thin portion.

3. The working method for an end portion of a plate member according to claim 1, wherein
    by pressing the outer peripheral end of the thin portion in the thickness direction, a portion of the outer peripheral end of the thin portion is buried in the recessed portion.

4. The working method for an end portion of a plate member according to claim 1, wherein
    by pressing the outer peripheral end of the thin portion in the thickness direction, an entire portion of the thin portion including the outer peripheral end of the thin portion is pressed in the thickness direction.

5. The working method for an end portion of a plate member according to claim 1, wherein
    buffer layers are provided on respective main surfaces of the plate member.

6. A manufacturing method for a plate member formed of a thermoplastic resin, comprising:
    cutting the plate member into a predetermined shape; and
    a first working process of heating and pressing an end portion of the plate member in a thickness direction to form a thin portion, the thin portion being formed such that a pressed surface of the thin portion has a recessed portion at a position adjacent to an inner end of the thin portion on an inner side of the plate member, a second working process of folding the thin portion to move an outer peripheral end of the thin portion on an outer peripheral side of the plate member to a vicinity of a main body portion of the plate member to which the inner end of the thin portion is connected, and a third working process of pressing an outer surface of a first portion of the outer peripheral end of the thin portion in the thickness direction to move the outer peripheral end of the thin portion further inward than a surface of the main body portion in the thickness direction, such that the outer surface of the first portion of the outer peripheral end is moved further inward in the thickness direction than an outer surface of a second portion of the outer peripheral end.

7. The manufacturing method for a plate member according to claim 6, wherein
    a portion of the main body portion adjacent to the outer peripheral end of the thin portion is pressed in the thickness direction together with the outer peripheral end of the thin portion in the third working process.

8. The manufacturing method for a plate member according to claim 6, wherein
    a portion of the outer peripheral end of the thin portion is buried in the recessed portion in the third working process.

9. The manufacturing method for a plate member according to claim 6, wherein
    an entire portion of the thin portion including the outer peripheral end of the thin portion is pressed in the thickness direction in the third working process.

10. The manufacturing method for a plate member according to claim 6, wherein
    buffer layers are provided on respective main surfaces of the plate member.

11. A working method for an end portion of a plate member formed of a thermoplastic resin, comprising:
    heating and pressing the end portion of the plate member in a thickness direction to form a thin portion, the thin portion being formed such that a pressed surface of the thin portion has a recessed portion at a position adjacent to an inner end of the thin portion on an inner side of the plate member;
    folding the thin portion to move an outer peripheral end of the thin portion on an outer peripheral side of the plate member to a vicinity of a main body portion of the plate member to which the inner end of the thin portion is connected; and
    moving a slide cam in the thickness direction to press the outer peripheral end of the thin portion in the thickness direction to move the outer peripheral end of the thin portion further inward than a surface of the main body portion in the thickness direction.

12. The working method for an end portion of a plate member according to claim 11, wherein
    by pressing the outer peripheral end of the thin portion in the thickness direction, a portion of the main body portion adjacent to the outer peripheral end of the thin portion is pressed in the thickness direction together with the outer peripheral end of the thin portion.

13. The working method for an end portion of a plate member according to claim 11, wherein
    by pressing the outer peripheral end of the thin portion in the thickness direction, a portion of the outer peripheral end of the thin portion is buried in the recessed portion.

14. The working method for an end portion of a plate member according to claim 11, wherein
    by pressing the outer peripheral end of the thin portion in the thickness direction, an entire portion of the thin portion including the outer peripheral end of the thin portion is pressed in the thickness direction.

15. The working method for an end portion of a plate member according to claim 11, wherein buffer layers are provided on respective main surfaces of the plate member.

\* \* \* \* \*